Nov. 24, 1959 M. LEVIN ET AL 2,914,673

VARIABLE PHASE SHIFT NETWORK

Filed April 18, 1958 2 Sheets-Sheet 1

INVENTORS
MORRIS LEVIN &
FRANK SHANDELMAN
BY Edward M. Farrell
ATTORNEY

INVENTOR.
MORRIS LEVIN &
FRANK SHANDELMAN
BY Edward M. Farrell
ATTORNEY

United States Patent Office 2,914,673

Patented Nov. 24, 1959

2,914,673

VARIABLE PHASE SHIFT NETWORK

Morris Levin, Abington, and Frank Shandelman, Levittown, Pa., assignors to Tele-Dynamics Inc., a corporation of Pennsylvania Application April 18, 1958, Serial No. 729,473

9 Claims. (Cl. 250—27)

This invention relates to a variable phase shift network and more particularly to a variable phase shift network for use in tape error compensation systems.

Magnetic tape has become one of the predominant means of storing telemetered data. Such telemetered data may be in various forms, such as for example multiplexed FM subcarrier signals. The use of magnetic tape for recording telemetered information affords numerous advantages. For example, storage by magnetic tape makes it possible to quickly select certain portions of the recorded information for study with a minimum amount of physical equipment. In addition, large quantities of telemetered information may be stored in a relatively small space.

Various types of errors are often introduced during the recording and playback of the information signals. Errors may arise when the tape playback velocity is not exactly equal to the tape velocity during recording. Wow and flutter errors, particularly troublesome in tape recording systems, may be caused by speed variations in the tape transport system, vertical movement of the tape, tape stretch, varying vibrations or by other factors. For efficient operation, it is essential that the errors resulting from recording or playback should not be of such magnitudes as to reduce the accuracy of the original telemetered information signals.

In the past, tape error compensation systems have included means for recording a reference tone signal, for example a tone signal having a frequency of 100 kilocycles, at the same time and on the same tape track as the telemetered signal. The telemetered signal may comprise a signal subcarrier signal or a composite signal having a plurality of subcarrier signals. During recording, wow and flutter errors, as well as other errors, cause modulation of the reference signal as well as the subcarrier signal. During storage and playback, additional errors may be introduced which modulate the reference and telemetered subcarrier signals.

In some presently employed systems, a reference discriminator is provided for demodulating the reference signal to recover the error signals which may have resulted from wow, flutter and other causes during the recording or playback operations. The subcarrier signal is applied to a subcarrier discriminator to recover the original information data with the data containing the same error signals as the reference tone signal, since the reference and sub-carrier signals were both subjected to the same conditions during the tape recording and playback operations. The output error signal from the reference discriminator, representing the demodulated error signal, is applied 180° out of phase to the output error signal from the subcarrier discriminator. The demodulated error signal from the reference discriminator is combined with the demodulated error signal from the subcarrier discriminator to effectively cancel the errors introduced during the recording and playback operation.

In order to provide a system of high accuracy, the demodulated output error signal from the reference discriminator should be the same amplitude as the error signal from one of the subcarrier discriminators. The phase difference between the error signals from the reference discriminator and the subcarrier discriminator should be 180° to provide effective cancellation.

In most subcarrier discriminators used in telemetering systems, various filters are employed. These filters, as well as other phase shifting circuits, tend to vary the phase of transmitted signals. The phase variations involved are generally different for different frequencies. For example, in the case where filters are employed, a subcarrier discriminator may have a time or phase delay which is the inverse function of the frequency to to which the filter is designed.

Compensation for variations in amplitude between the output error signal from a reference discriminator and the error signal from a subcarrier discriminator may generally be provided through the use of potentiometers or other suitable voltage dividing networks. However, providing a convenient and relatively inexpensive means for varying the phase or time difference for different frequencies has presented some problems. In the past, correct time or phase relationships for the signals involved have been achieved through the use of complicated filter arrangements which have involved a relatively large number of components. In many cases, the filter arrangements employed are not easily variable and involve much time to obtain the proper phase relationships during the manufacture of tape error compensation systems.

It is an object of this invention to provide an improved variable phase network.

It is a further object of this invention to provide an improved variable phase network for tape error compensation systems.

It is still a further object of this invention to provide an improved variable phase network which is easily adjusted, is relatively simple and which requires a minimum number of components.

In accordance with the present invention, a variable phase network is provided and includes a twin T filter. A low impedance source including an amplifier provides the input circuit to the twin T filter and a high impedance is provided across the output circuit. Signals are applied to the twin T network from the low impedance source. The amplifier inverts the original signals 180° and the inverted signals are applied to the common leg of the twin T network. Means are associated with the amplifier for adjusting the amplitude of the inverted signals. The phase shift characteristic of the twin T network is variable and dependent upon the amplitude of the inverted signals.

Other objects and advatages of the present invention will be apparent and suggest themselves to those skilled in the art to which the present invention is related, from a reading of the following specification and claims in conjunction with the accompanying drawings, in which:

Figure 1:
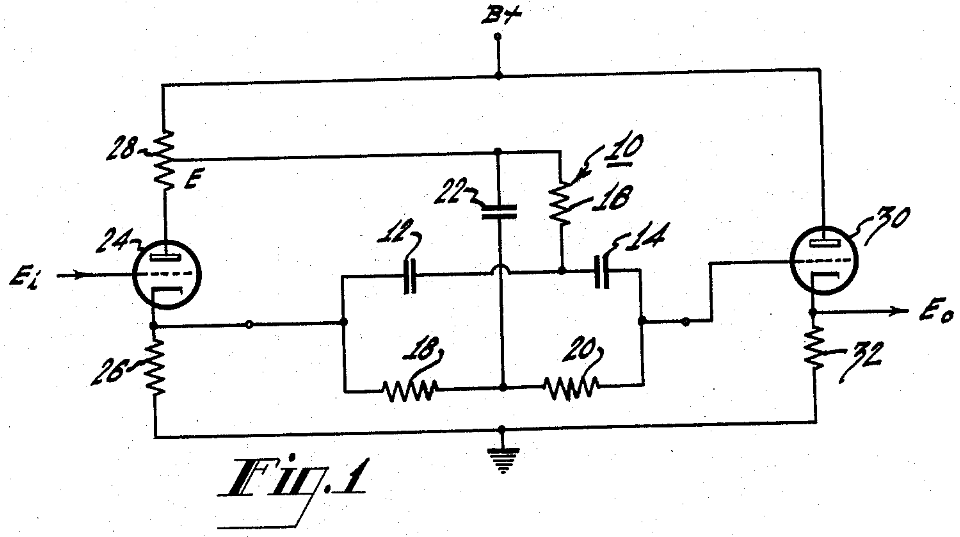
Figure 1 is a schematic diagram of a variable phase shift circuit, in accordance with the present invention.

Referring particularly to Figure 1, a twin T network 10 comprises two T networks. The first T network includes capacitors 12, 14 and a shunt resistor 16. The second T network comprises resistors 18, 20 and a shunt capacitor 22. The two networks are connected to common input and output terminals thereby providing a pair of parallel transmission paths. The T network comprising the resistors 18, 20 and capacitor 22 is a filter of the low pass type which transmits direct current and low frequency alternating current with relatively small loss and attenuates high frequency currents. The T network comprising the capacitors 12, 14 and the resistor 16 is a high pass filter which provides a high attenuation to low frequency current. The two T networks in combination provide a band elimination filter which may be proportioned to suppress the transmission of alternating currents in any selected frequency range. The basic circuit involved in a twin T network is shown and described in a patent entitled "Electronic Filter" issued to H. W. Augustadt, 2,106,785, on February 1, 1938.

The input circuit to the twin T network 10 includes a triode amplifier 24 which includes a cathode resistor 26 and a variable plate resistor 28. The cathode of the triode amplifier 24 is connected to the input circuit of the twin T network 10. The output circuit of the twin T network 10 includes a triode device 30 which includes a cathode resistor 32. The common leg of the twin T network 10, which includes the resistor 16 and the capacitor 22, is connected to the variable plate resistor 28. An incoming signal, designated $E_1$ representing an error signal is applied to the control grid of the amplifier device 24. The output signal from the triode device 30 is designated $E_0$.

Figure 2:
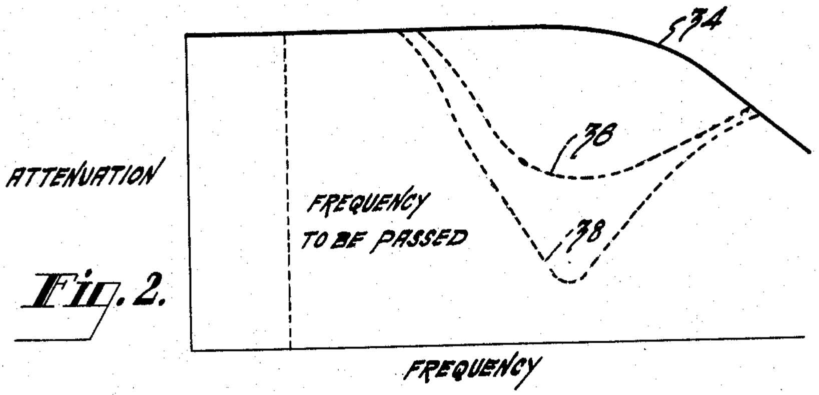
Figure 2 is a chart showing curves representing the attenuation characteristic of a phase shift network utilized in the present invention.

Referring particularly to Figure 2, curves 34, 36 and 38 illustrate the various attenuation characteristics for different positions of the control associated with the resistor 28. The twin T network 10 is designed for a maximum frequency of attenuation, as illustrated by the dips in curves 36 and 38. The particular frequency of maximum attenuation is determined by the values ascribed to the resistors and capacitors included in the twin T network 10, as well as the input and output impedances to the network.

The amplifier device 24, acting as a cathode follower to provide a low impedance is included in the input circuit of the twin T network. The triode device 30, with the twin T network 10 being connected to its control grid, provides a high impedance for the output circuit of the twin T network.

Figure 3:
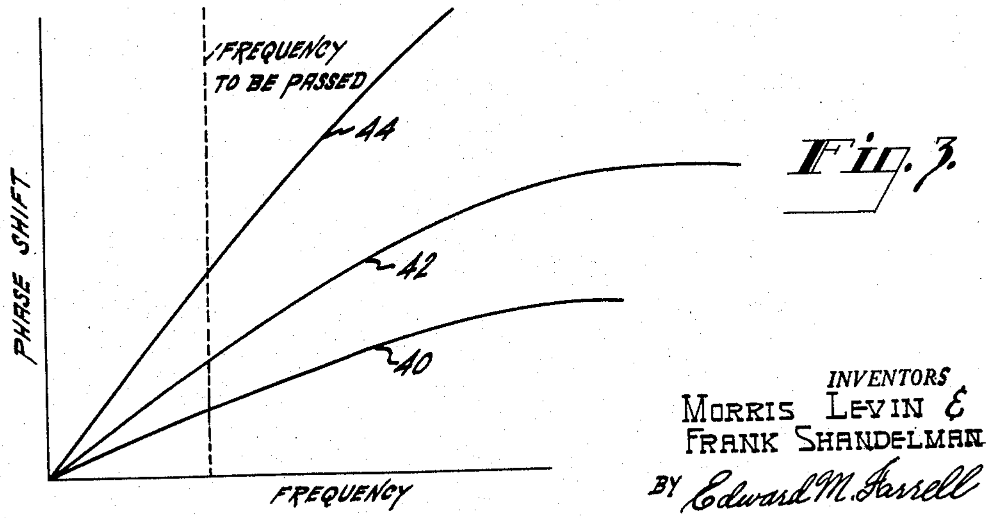
Figure 3 is a chart showing curves representing the phase shift characteristic of a variable phase shift network embodying the present invention; and, Figure 4 is a block diagram illustrating a portion of a tape error compensation system involving a variable phase shift network embodying the present invention.

Referring particularly to Figure 3, curves 40, 42 and 44 illustrate various phase characteristics for different positions of the resistor 28. It is known that when the attenuation characteristic of a twin T network is varied, the phase shift characteristic is also varied.

Various attenuation and phase shift characteristics for twin T networks are described in a report No. R-3167 entitled "Transfer Characteristics of a Bridged Parallel-T Network" by Charles F. White, issued by the Naval Research Laboratory on August 27, 1947. This report discusses the effects of variations in the attenuation characteristic upon the phase characteristic on a twin T network.

When the variable control associated with the resistor 28 is at B+, i.e., at the top of the resistor, the attenuation characteristic of the twin T network 10 will be that illustrated by the curve 38. The phase characteristic of the twin T network at this point is illustrated by a curve 40 in Figure 3. When the variable control associated with the resistor 28 is at an intermediate point, the attenuation characteristic will be that illustrated by the curve 36 and the phase characteristic will be that illustrated by the curve 42. When the variable control associated with the resistor 28 is positioned at the anode of the triode amplifier 24, i.e. at the bottom of the resistor, the attenuation characteristic will be that illustrated by the curve 34 and the phase characteristic will be that illustrated by the curve 44. It is seen that variation of the attenuation characteristics by varying the control associated with the resistor 28 will produce a variation in phase characteristic of the twin T network 10. In the circuit shown, the variations in attenuation and phase characteristic are not accompanied by any substantial variation in the maximum frequency of attenuation. It is noted that the variation in phase is linear with variations of the resistor 28. This is an important feature in many systems.

In many applications, especially in tape error compensation systems, it is desired that the phase shift of a signal be linearly variable without varying the amplitude of the transmitted signal. For this reason, it is preferable to employ a twin T network having a maximum frequency of attenuation much greater than the frequency to be passed by the network. It is seen from the attenuation characteristic curves of Figure 2 that if the frequency of the signal transmitted through the twin T network 10 is much lower than the maximum frequency of attenuation, the amplitude of the transmitted signal will remain relatively constant. With the relatively constant amplitude of the signal, however, the phase characteristic of the transmitted signal is still variable, as illustrated in Figure 3.

The variation in the attenuation characteristic, and consequently the phase characteristic, is provided by a form of feedback from the variable resistor 28 to the common leg of the twin T network 10. When the common leg of the twin T network is at A.C. ground or B+, the twin T network 10 operates in a normal manner and provides the maximum attenuation at the frequency to which the network is tuned. As the return for the common leg of the twin T network is moved toward the anode of the triode amplifier 24, a variable signal is fed into the common leg of the twin T network. The signal fed into the twin T network 10 from the resistor 28 is 180° out of phase with the signal from the cathode of the amplifier 24. Thus the signal at the anode may be considered as an inverted form of the signal applied to the control grid of the amplifier device 24. Since two signals of opposite phase are fed to the twin T network 10, a cancelling effect occurs to diminish the amount of attenuation in the twin T network. It is seen that when the control at the variable resistor 28 is at the anode of the triode amplifier 24, an inverted signal of maximum amplitude will be applied to the common leg of the twin T network and the degree of attenuation represented by the curve 34 is very slight. In a preferred operation, the resistors 26 and 28 are made substantially equal in value and provides a phase splitting network.

Figure 4:
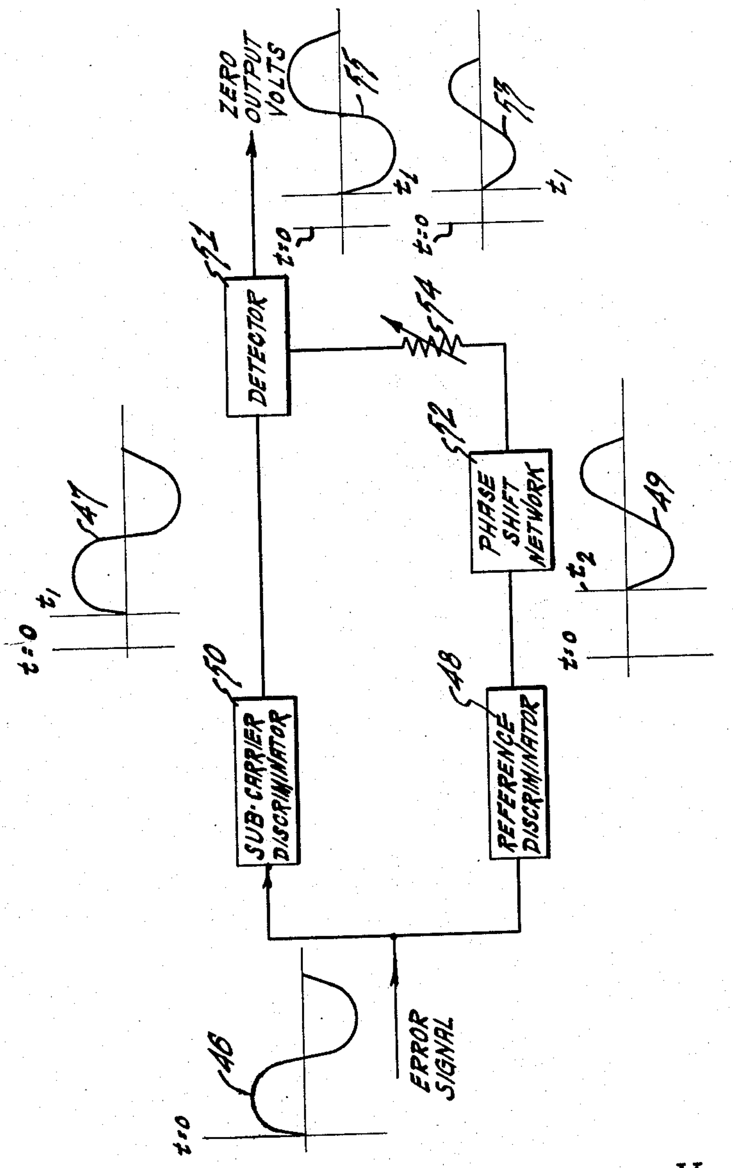

Referring particularly to Figure 4, a block diagram illustrating a portion of a tape error compensation system is shown. A modulating error signal, represented by a curve 46 is applied to a reference discriminator 48 and a subcarrier discriminator 50. The output signal from the reference discriminator is illustrated by the curve 47, shifted in phase by a time indicated $t_1$.

As was pointed out, for high accuracy it is necessary that the output signal from the reference discriminator 48 be substantially equal in amplitude and 180° out of phase with the output error signal from the subcarrier discriminator 50. The reference discriminator 48 is designed to demodulate the error signal which may be included in an originally recorded tone reference signal. The subcarrier discriminator 50 is employed to demodulate a subcarrier signal which includes an original information signal as well as the error signals.

The output error signal from the reference discriminator 48, which is illustrated by the curve 49 delayed by time $t_2$, is applied to a phase shift network 52. This network 52 may be of the type illustrated and described in connection with Figure 1. The output signal from the phase shift network 52, illustrated by a curve 53 delayed by a time $t_1$, is varied in amplitude by the potentiometer 54 to provide a signal represented by the curve 55, delayed by the time $t_1$. The signal from the potentiometer 54 being equal in amplitude and 180° out of phase with the error signal from the subcarrier discriminator 50, is applied to the detector 51. The error signal from the subcarrier discriminator 50 is also applied to the detector 51 and is effectively cancelled by the error signal from the phase shift network 52. Various test or metering devices may be employed in the output circuit of the detector 51 to ascertain that the degree of phase shift and amplitude of the reference error signal is accurately set to cancel the error signals originating in the recording and playback operations. Accurate settings for phase and amplitude may be indicated when the output voltage representing the error signals is zero volts at the output circuit of the detector 51.

It is seen that the present invention has provided an adjustable phase shift network which is relatively simple and which requires a minimum number of electronic components. While such a variable phase shift network has particular application in tape error compensation systems, it is apparent that such a network may be employed in various other systems which require a variable phase shifting of electrical signals which is linear with variations in frequency and of constant amplitude with variations in frequency.

What is claimed is:

1. A variable phase network comprising a source of signals, a twin T network being characterized by a frequency of maximum attenuation higher than the frequency of said signals, means for applying said signals to said twin T network, means for inverting said signals, means for applying the inverted signals to the common leg of said twin T network, and means for adjusting the amplitude of said inverted signals to vary the phase shift characteristic of said twin T network.

2. A variable phase shift network comprising a twin T network being characterized by a frequency of maximum attentuation, a low impedance source of signals included in the input circuit of said twin T network, the frequency of said signal being higher than said frequency of maximum attenuation, a high impedance load included in the output circuit of said twin T network, means for inverting said signals, means for varying the amplitude of the inverted signals, and means for applying said inverted signals to the common leg of said twin T network to vary the phase characteristic of said twin T network.

3. A variable time delay network comprising a low impedance source of signals, a twin T network having an attenuation characteristic and a phase shift characteristic variable in accordance with said attenuation characteristic, said twin T network being characterized by a frequency of maximum attenuation higher than the frequency of said signals, means for applying said signals to said twin T network, means for inverting said signals substantially 180°, means for applying the inverted signals to the common leg of said twin T network, means for adjusting the amplitude of said inverted signals to vary the attenuation and phase characteristic of said twin T network in accordance with the amplitude of said inverted signals, a high impedance load, and means for applying the output signals from said twin T network to said high impedance output load.

4. A variable phase shift network comprising a twin T network having a maximum attenuation characteristic for a predetermined frequency and a phase shift characteristic variable in accordance with said attenuation characteristic, an electron discharge device having an anode, a cathode and a control grid, means for applying to said control grid signals of a frequency substantially below said predetermined frequency of said twin T network, a cathode resistor connected in the cathode circuit of said electron discharge device, means for applying the signals across said cathode to said twin T network, a variable resistor included in the anode circuit for varying the amplitude of the signals developed thereacross, the signals across said variable resistor being substantially 180° out of phase with the signals across said cathode resistor, means for applying the signals from said variable resistor to the common leg of said twin T network to vary the attenuation and phase shift characteristic of said twin T network, a second electron discharge device including an anode, a cathode and a control grid, and means for applying signals from said pair of twin T networks to said control grid of said second electron discharge device.

5. A variable phase shift network in accordance with claim 4 wherein said cathode and variable resistors are of substantially equal value to provide a phase splitting network.

6. A variable time delay network for a tape error compensation system comprising a pair of T networks connected in parallel relationship and including a common leg, said pair of T networks having maximum attenuation characteristics for a predetermined frequency and a phase shift characteristic variable in accordance with said attenuation characteristic, an electron discharge device having an anode, a cathode and a control grid, means for applying to said control grid error signals of a frequency substantially below said predetermined frequency of maximum attenuation of said pair of T networks, a cathode resistor connected in the cathode circuit of said electron discharge device, means for applying the signals across said cathode resistor to said pair of T networks, a potentiometer included in the anode circuit for varying the amplitude of the signals developed thereacross, the signals across said potentiometer being substantially 180° out of phase with the signals across said cathode resistor, said cathode resistor and said potentiometer being of substantially equal value to provide a phase splitting network, means for applying the signals from said potentiometer to the common leg of said pair of T networks to vary the attenuation and phase shift characteristic of said pair of T networks, a second electron discharge device including an anode, a cathode and a control grid, and means for applying signals from said pair of T networks to said control grid of said second electron discharge device.

7. A tape error compensation system comprising a subcarrier discriminator for demodulating a carrier signal to provide error signals, a reference discriminator for demodulating a reference carrier signal to provide reference error signals, a twin T network having a frequency of maximum attenuation higher than the frequency of said reference error signals, means for applying said reference error signals from said reference discriminator to said twin T network, means for inverting said error reference signals, means for applying the inverted error reference signals to said twin T network, means for varying the amplitude of said inverted error reference signals to vary the phase characteristic of said twin T network whereby the phase of the error signals from said reference discriminator is made substantially 180° out of phase with the error signals from said subcarrier discriminator, a high impedance load, means for applying the output error reference signals from said twin T network to said high impedance output load, a detector circuit, means for applying the error signals from said subcarrier discriminator to said detector circuit, a second means for varying the amplitude of the error reference signals from said high impedance load to substantially the same amplitude as the error signals from said subcarrier discriminator, and means for applying said reference error signals from said high impedance load to said detector to cancel the error signals from said subcarrier discriminator.

8. A tape error compensation system comprising a subcarrier discriminator for demodulating a carrier signal to provide error signals, a reference discriminator for demodulating a reference carrier signal to provide reference error signals, a twin T network tuned to a frequency of maximum attenuation and having a relatively uniform frequency response for a wide band of low frequencies, an amplifier including a low impedance circuit, means for applying said reference error signals from said reference discriminator to said amplifier to provide inverted error signals, means for applying said reference error signals from said low impedance circuit of said amplifier to said twin T network, the frequency of said error reference signals being substantially below said frequency of maximum attenuation whereby said error reference signals are transmitted through said twin T network without attenuation, means for applying the inverted error reference signals from said amplifier to the common leg of said twin T network, a variable resistor included in the output circuit of said amplifier for varying the amplitude of said inverted error reference signals to adjust the phase relationship of the error signals from said reference discriminator to substantially 180° out of phase with the error signals from said subcarrier discriminator, a high impedance load, means for applying the output error reference signals from said twin T network to said high impedance output load, a detector circuit, means for applying the error signals from said subcarrier discriminator to said detector circuit, means for varying the amplitude of the error reference signals from said high impedance load to substantially the same amplitude as the error signals from said subcarrier discriminator, and means for applying said reference error signals from said high impedance load to said detector to cancel the error signals from said subcarrier discriminator.

9. A tape error compensation system as set forth in claim 8 wherein said low impedance circuit comprises a resistor substantially equal in value to said variable resistor to provide a phase splitting network.

References Cited in the file of this patent

UNITED STATES PATENTS 2,584,386 Hare ------------------ Feb. 5, 1952

OTHER REFERENCES

Fidelman: "RC Filter Circuits," Radio-Electronic Engineering, October 1951, pp. 3–6, 24 and 25.

Morris: "Q as a Mathematical Parameter," Electronic Engineering, July 1954, pp. 306–7.